United States Patent
Powell

(10) Patent No.: US 8,496,094 B2
(45) Date of Patent: Jul. 30, 2013

(54) SPRING SUSPENSION FOR A HANDLEBAR-STEERED VEHICLE

(75) Inventor: Robert Powell, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 12/572,171

(22) Filed: Oct. 1, 2009

(65) Prior Publication Data
US 2011/0079945 A1   Apr. 7, 2011

(51) Int. Cl.
F16F 9/48   (2006.01)
(52) U.S. Cl.
USPC ............................ 188/285; 267/34; 280/276
(58) Field of Classification Search
USPC ............... 188/282.6, 282.9, 321.11; 267/34,
267/64.15, 179, 225, 226, 252, 288, 289,
267/169, 174, 291; 280/276
See application file for complete search history.

(56) References Cited

U.S. PATENT DOCUMENTS

| | | | | | |
|---|---|---|---|---|---|
| 783,236 | A | * | 2/1905 | Ashburn | 280/276 |
| 815,188 | A | * | 3/1906 | Mans | 267/28 |
| 1,232,912 | A | * | 7/1917 | Glass | 267/28 |
| 1,714,646 | A | * | 5/1929 | Thomann | 267/226 |
| 1,887,579 | A | * | 11/1932 | Augusto | 267/225 |
| 2,475,774 | A | * | 7/1949 | Benson | 280/276 |
| 2,627,405 | A | * | 2/1953 | Hlatko et al. | 267/218 |
| 3,260,536 | A | * | 7/1966 | Sundby | 280/481 |
| 3,984,119 | A | | 10/1976 | Okazima | |
| 4,318,535 | A | * | 3/1982 | Imai | 267/226 |
| 5,820,114 | A | * | 10/1998 | Tsai | 267/202 |
| 6,513,822 | B1 | * | 2/2003 | Chonan | 280/276 |
| 6,592,136 | B2 | * | 7/2003 | Becker et al. | 280/276 |
| 6,607,185 | B2 | * | 8/2003 | Graves et al. | 267/64.26 |
| 2003/0001358 | A1 | | 1/2003 | Becker | |
| 2003/0034596 | A1 | * | 2/2003 | Barefoot et al. | 267/131 |
| 2005/0087953 | A1 | * | 4/2005 | Becker et al. | 280/276 |

FOREIGN PATENT DOCUMENTS

| | | |
|---|---|---|
| CA | 450290 | 8/1948 |
| CN | 2237595 | 10/1996 |
| CN | 201205959 | 3/2009 |
| DE | 805122 | 5/1951 |
| DE | 911465 | 5/1954 |
| DE | 855934 | 1/1957 |
| DE | 955934 | 1/1957 |
| FR | 924865 | 8/1947 |
| JP | 2003097615 | 4/2003 |
| JP | 2008044569 | 2/2008 |

OTHER PUBLICATIONS

European Search Report mailed Nov. 21, 2011.

* cited by examiner

*Primary Examiner* — Robert A Siconolfi
*Assistant Examiner* — Stephen Bowes
(74) *Attorney, Agent, or Firm* — Milan Milosevic; Lisa Serdynski; Steven Courtright

(57) ABSTRACT

A coil spring suspension designed for a handlebar-steered vehicle. The coil spring suspension generally includes a first tube, a coil spring, a shaft and a guide. A first end of the coil spring is disposed within the first tube and fixedly supported proximate a first end of the first tube. The coil spring extends beyond a second end of the first tube. The shaft fixedly supports a second end of the coil spring. The shaft and the first tube are slidably displaced relative to each other upon suspension loading to lengthwise compress the coil spring. The guide is disposed within the first tube and connected to the coil spring between the first and second ends of the coil spring. The guide is displaced with the coil spring under suspension loading and limiting lateral displacement of the coil spring.

20 Claims, 4 Drawing Sheets

SPRING SUSPENSION FOR A HANDLEBAR-STEERED VEHICLE

BACKGROUND OF INVENTION

The present invention relates to suspension systems, and more particularly, to a spring suspension that includes a spring extending lengthwise beyond a suspension tube housing the spring and a guide disposed within the suspension tube to limit lateral displacement of the spring.

Spring suspension systems, typically coil spring suspensions used on handlebar-steered vehicles such as bicycles and motorcycles, include an upper tube slidable within a lower tube and a coil spring assembly disposed entirely within the upper tube. The coil spring assembly may include positive and negative coil springs stacked in series. To obtain the desired riding characteristics, the coil springs are assembled to have some preload, typically requiring the springs be trapped inside the upper tube. A disadvantage of this spring stack-up is a longer upper tube, thus adding extra weight to the suspension system. Accordingly, there is a need for a suspension system that uses a shorter upper tube, thereby reducing the weight of the overall suspension system.

SUMMARY OF THE INVENTION

The present invention provides a coil spring suspension including a coil spring extending beyond a first tube which allows the use a short tube thereby reducing the weight of the suspension. The coil spring suspension may be used on a handlebar-steered vehicle such as a bicycle or motorcycle. A first end of the coil spring is disposed within the first tube and is fixedly supported proximate a first end of the first tube. The coil spring extends beyond the second end of the first tube. A shaft fixedly supports the second end of the coil spring. The shaft and the first tube slidably displaced relative to each other upon suspension loading to lengthwise compress the coil spring. A guide is disposed within the first tube and connected to the coil spring between first and second ends of the coil spring. The guide is displaced within the first tube and is connected to the coil spring between the first and second ends of the coil spring. The guide is displaced within the coil spring to limit lateral displacement of the coil spring and thereby shield the coil spring from contact with the first tube.

In one embodiment of the present invention, the guide includes an opening slidably receiving and guiding the shaft within the first tube. The guide is non-elastomeric. A smaller diameter segment of the coil spring extends lengthwise between the guide and the second end of the coil spring. The guide has an outer diameter greater than the larger diameter segment of the coil spring. A larger diameter segment of the coil spring has an outer diameter that substantially equals an inner diameter of the first tube, reducing buckling of the coil spring. The coil spring is helically connected to the guide. A first end of the shaft has a cap with a greater diameter than the opening of the guide. A second end of the shaft fixedly supports the second end of the coil spring.

The coil spring suspension may further include a retaining ring fixedly and interiorly attached to the first tube proximate the second end of the first tube. The retaining ring has an inner diameter smaller than an outer diameter of the guide to prevent the guide from exiting the second end of the first tube under rebound loading.

The coil spring suspension may also include a second tube having first and second ends. The first end of the second tube slidably receives the second end of the first tube. The second end of the shaft is fixed to the second end of the second tube.

In one embodiment of the present invention, the first and second tubes form a first leg. The coil spring suspension further includes a second leg including a third tube slidably receiving a fourth tube. The coil spring is a positive spring biasing the first tube away from the second tube, and the third tube away from the fourth tube and the second leg includes a negative spring biasing the first tube toward the second tube and the third tube toward the fourth tube.

These and other features and advantages of the present invention will be more fully understood from the following description of certain embodiments of the invention, taken together with the accompanying drawings.

DETAILED DESCRIPTION

Figure 1:
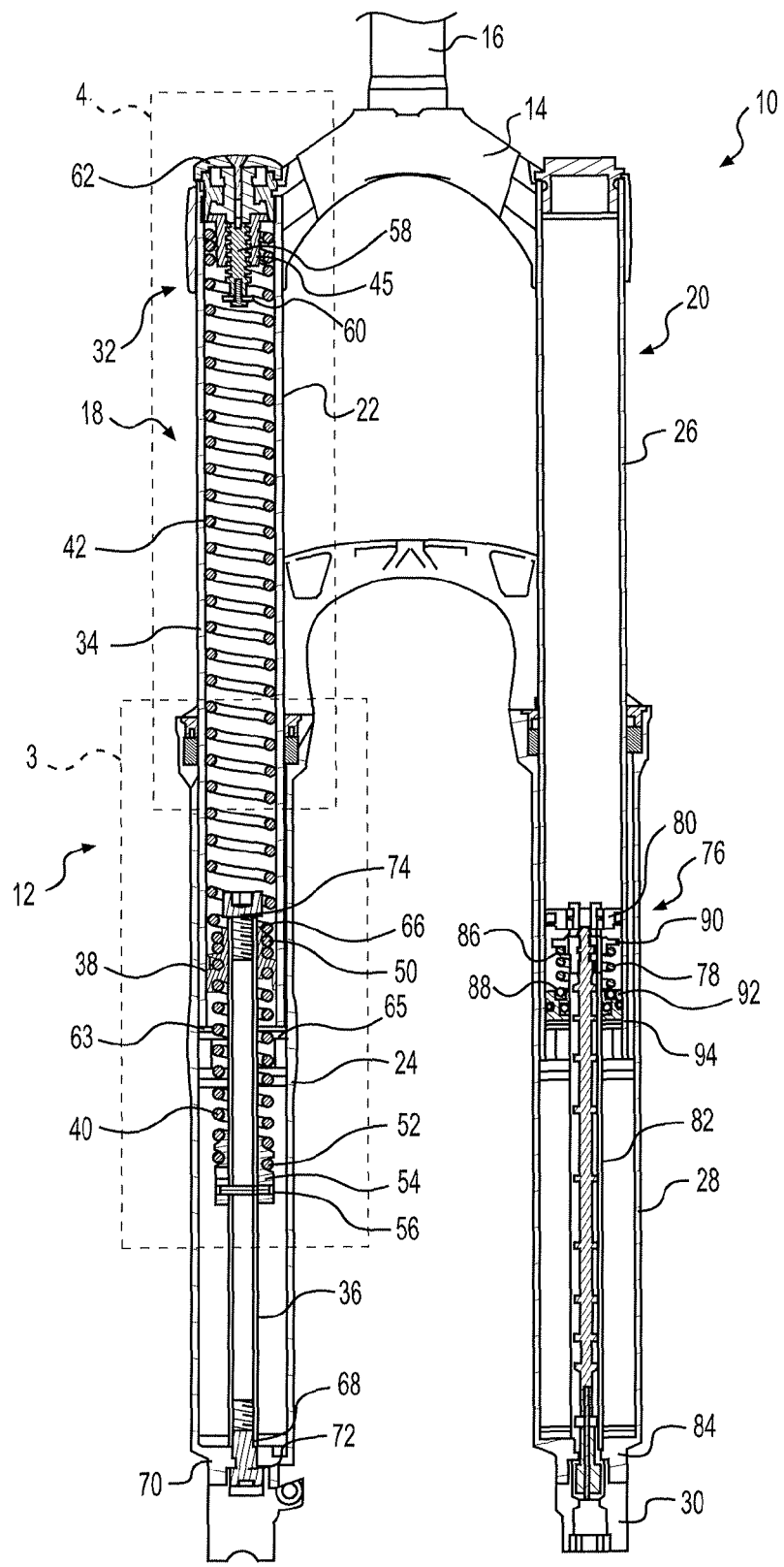
FIG. 1 is a cross-section of a bicycle suspension fork including a coil spring suspension according to one embodiment of the present invention in an unloaded position.

FIGS. 1-4 illustrate a bicycle front suspension fork 10 that includes a coil spring suspension 12 according to one embodiment of the present invention. The fork 10 includes a crown 14 connected to a steerer tube 16 and first and second legs 18, 20. The first leg 18 includes a first tube 22 (in this embodiment, an inner upper tube) slidably disposed within a second tube 24 (in this embodiment, an outer lower tube). The second leg 20 includes a third tube 26 (in this embodiment, an inner upper tube) slidably disposed within the fourth tube 28 (in this embodiment, an outer lower tube). The first and third tubes 22, 26 are connected to the crown 14 and the second and fourth tubes are connected to a wheel axle (not shown) through dropouts 30. It is to be understood that although the present invention is described with respect to a front suspension fork, the suspension system may also be embodied in a rear shock, a seat post, or at other locations on a bicycle frame. Further, the suspension 12 of the present invention may be used on motorcycles as well as other handlebar-steered vehicles.

The first leg 18 of the fork 10 generally includes the first and second tubes 22, 24, a spring preload adjuster assembly 32, a coil spring 34, a shaft 36 and a guide 38. The first tube 22 slides within the second tube 24 under suspension loading to compress or extend the coil spring 34. FIG. 1 shows the suspension fork 10 in an unloaded position and FIG. 2 in a loaded position. Bushings 23 are disposed between the first and second tubes 22, 24 to enable smooth sliding therebetween. The coil spring 34 is disposed in the first and second tubes 22, 24. The coil spring 34 includes smaller and larger diameter segments 22, 24, in this embodiment a single spring. Alternatively, two or more discrete coil springs may be used. A first end 44 of the larger diameter segment 42 is disposed within the first tube 22 and is fixedly connected to a spring seat 45 of the spring preload adjuster assembly 32 located at a first end 46 of the first tube 22. A second end 48 of the larger diameter segment 42 is disposed proximate the guide 38. The larger diameter segment 42 has an outer diameter that substantially equals an inner diameter of the first tube 22 to inhibit buckling of the coil spring 34 but still permit telescoping of the coil spring 34 therein.

A first end 50 of the smaller diameter segment 40 of the coil spring 34 is disposed in the first tube 22 and is helically connected to the guide 38. A second end 52 of the smaller diameter segment 40 is disposed in the second tube 24 and is fixedly supported by a perch 54 fixed to the shaft 36 by a pin 56. The second end 48 of the larger diameter segment 42 adjoins the first end 50 of the smaller diameter segment 40. The coil spring 34 is a positive spring biasing the first and second tubes 22, 24 lengthwise away from each other. The spring seat 45 of the spring preload adjuster assembly 32 is fixed to the first tube 22. A preload spindle 58 is rotatably connected to the spring seat 45 and includes a washer 60 at one end and a user-rotatable knob 62 at the other end. As the knob 62 is rotated, the rotating washer 60 helically draws in or releases a length of spring coil to adjust the preload of the coil spring 34.

The guide 38 is disposed within the first tube 22 and is helically connected to the coil spring 34 to join the smaller diameter segment 40 to the larger diameter segment 42. The guide 38 is non-elastomeric and has an outer diameter greater than the larger diameter segment 42 of the coil spring 34. The guide 38 is slidably supported along the inner diameter of the first tube 22 to limit lateral displacement of the coil spring 34 and thereby shield the coil spring 34 from contact with the first tube 22. A retaining ring 63 is fixedly attached to an inner surface of the first tube 22 proximate a second end 65 of the first tube 22. The retaining ring 63 has an inner diameter smaller than an outer diameter of the guide 38 to prevent the guide 38 from exiting the second end 65 of the first tube 22.

The shaft 36 is slidably received in an opening 64 of the guide 38 for centering the shaft 36 in the first tube 22. The shaft 36 also extends coaxially through the smaller diameter segment 40 of the coil spring 34. The shaft 36 has first and second ends 66, 68. The first end 66 of the shaft 36 is located within the first tube 22. A cap or bolt 74 is attached to the first end 66 of the shaft 36. The bolt 74 has a head diameter greater than a diameter of the guide opening 64 to prevent separation of the first tube 22 from the second tube 24 during rebound loading. The second end 68 of the shaft 36 is fixedly connected to an end 70 of the second tube 24 by a bolt 72.

The second leg 20 of the suspension fork 10 generally includes the third and fourth tubes 26, 28, a damper assembly 76 and a negative coil spring 78. The third tube 26 slides within the fourth tube 28 under suspension loading. Bushings are disposed between the third and fourth tubes 26, 28 to enable smooth sliding therebetween. The damper assembly 76 includes a damper piston 80 and a shaft 82. One end of the shaft 82 is connected to the damper piston 80 and the other end of the shaft 82 is connected to an end 84 of the fourth tube 28. The negative spring 78 is disposed in the third tube 26 and includes first and second ends 86, 88. The first end 86 is connected to a seat 90 and the second end 88 is connected to a seal 92 fixed to an end 94 of the third tube 26. The shaft 82 extends through the seat 92 and the negative spring 78. The negative spring 78 biases the third and fourth tubes 26, 28 toward each other.

Figure 2:
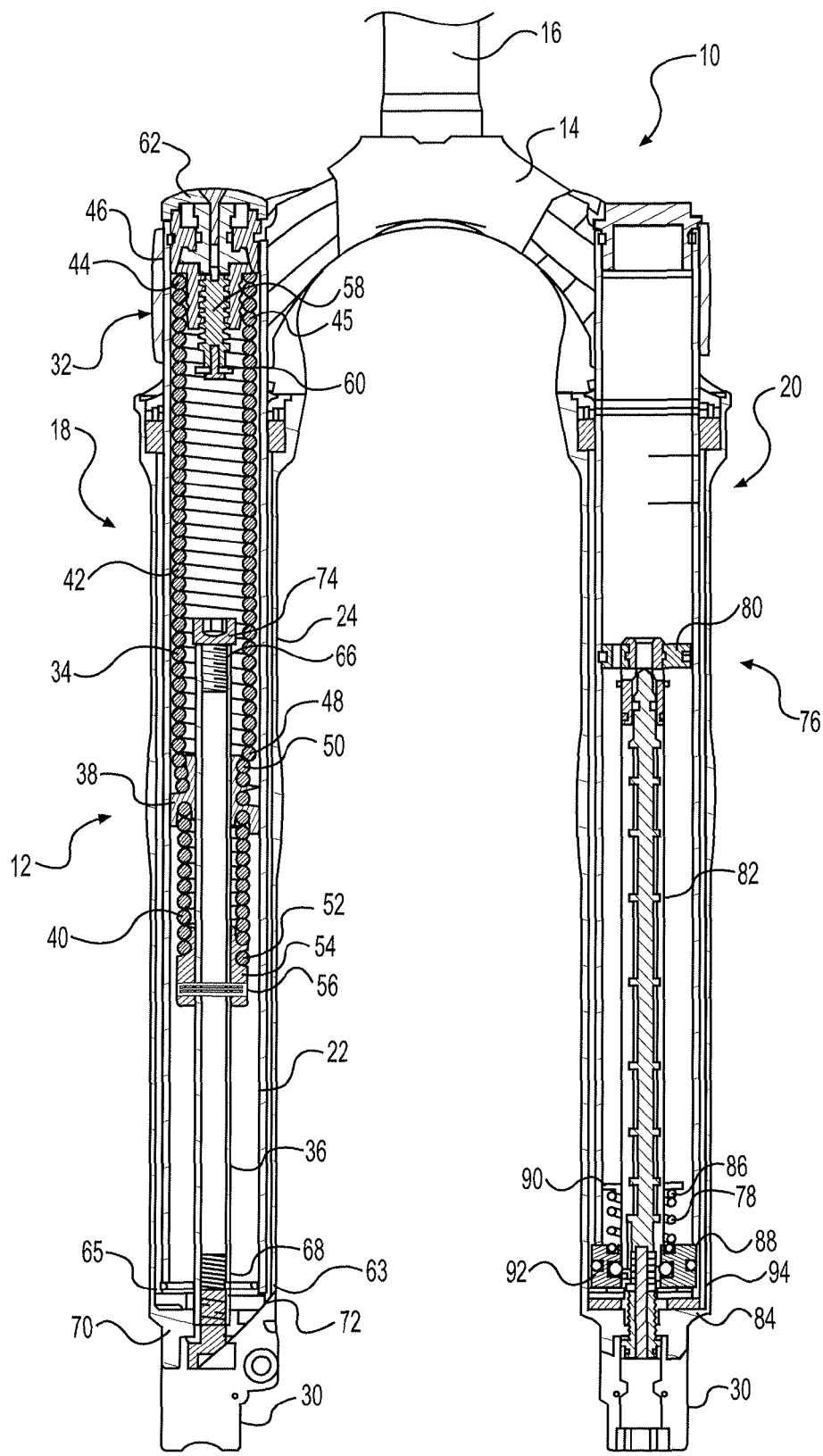
FIG. 2 is a cross-section of the bicycle suspension fork of FIG. 1 in a loaded position.
Figure 3:
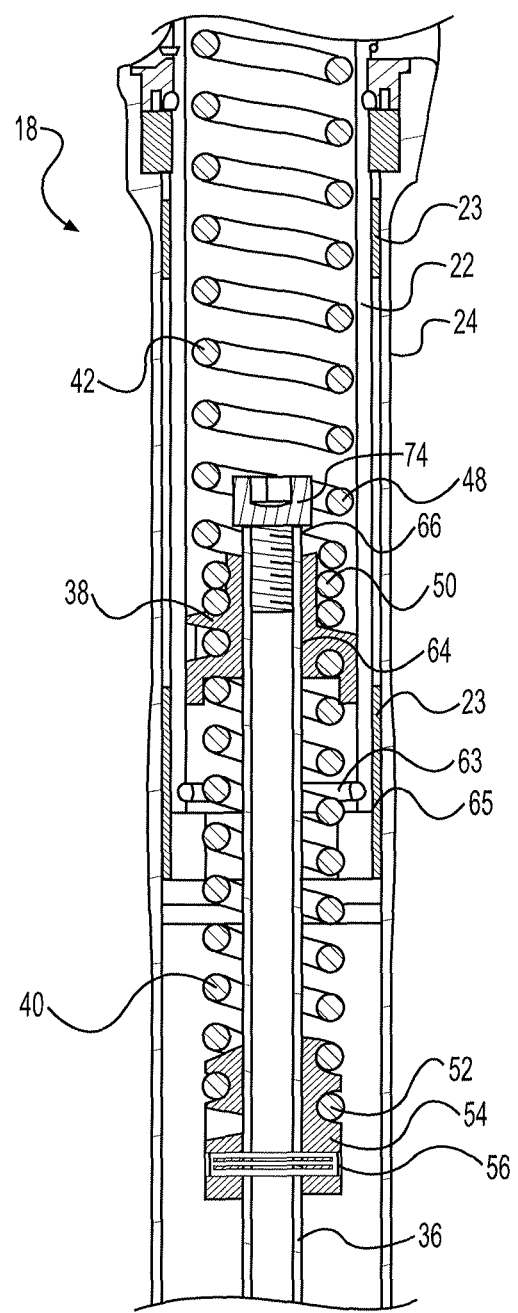
FIG. 3 is an enlarged partial cross-section of a first leg of the bicycle suspension fork of FIG. 1.
Figure 4:
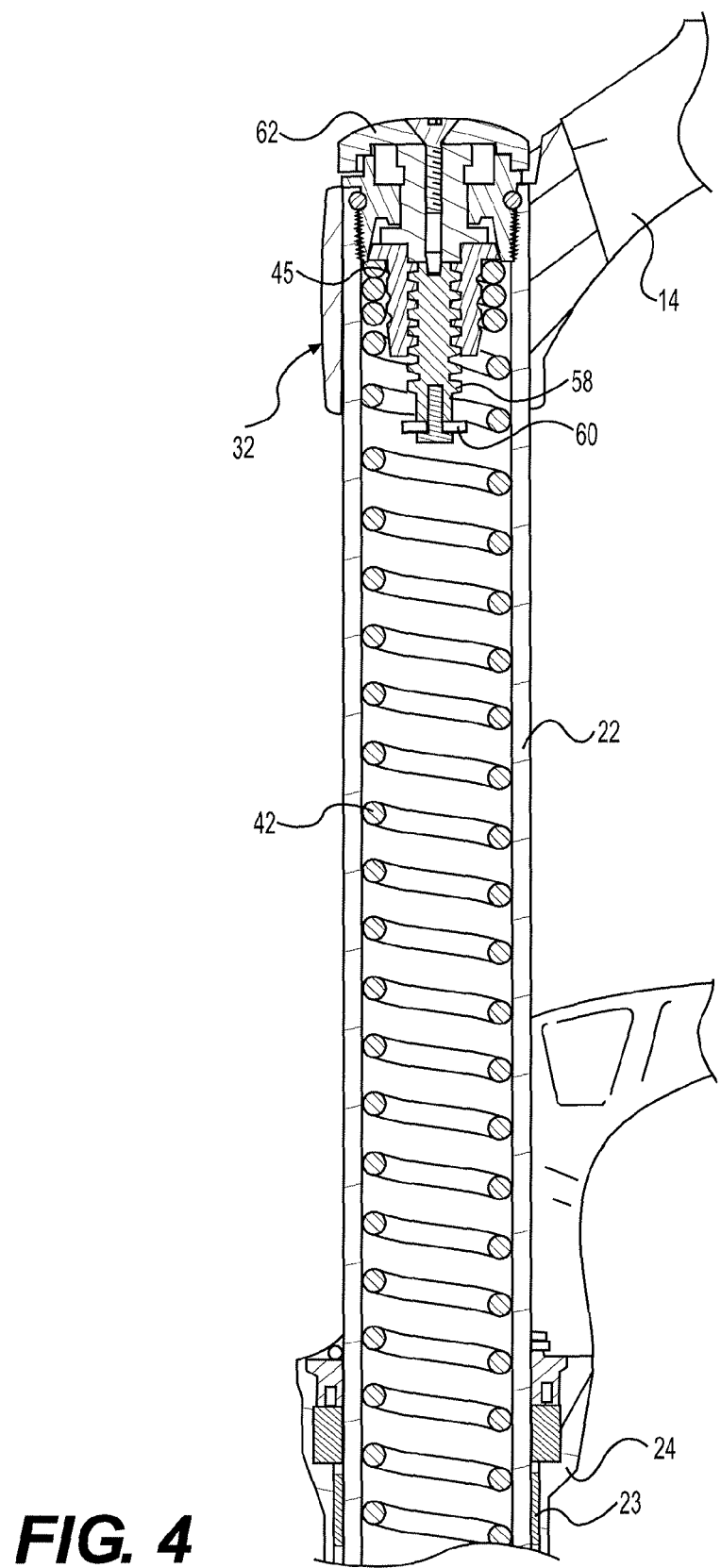
FIG. 4 is an enlarged partial cross-section of the first leg of the bicycle suspension fork of FIG. 1.

Under compression loading, the suspension fork 10 transitions from an unloaded position shown in FIG. 1 to a loaded position shown in FIG. 2, the shaft 36 smoothly displacing through the guide 38, the guide 38 centering the coil spring 34 as the guide 38 slidably displaces within the first tube 22. Under rebound loading, the guide 38 continues to center the coil spring 34 as the guide 38 slidably displaces within the first tube 22, the shaft 36 extending lengthwise away from the first tube 22. Under rebound topout, the shaft 36 continues to extend lengthwise away from the first tube 22, the shaft 36 pulling the bolt 74 downward, a bottom of the bolt head topping out against a top of the guide 38. Under rebound topout, the coil spring 34 pulls the guide 38 downward, the bottom of the guide 38 topping out against the retaining ring 63.

While this invention has been described by reference to one or more embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed:

1. A coil spring suspension for a handlebar-steered vehicle comprising:
   a first tube having first and second ends;
   a coil spring having first and second ends, the first end of the coil spring disposed within the first tube and fixedly supported proximate the first end of the first tube, the coil spring extending beyond the second end of the first tube;
   a shaft having a first end and a second end and a perch fixed to the shaft between the first and second ends, the second end of the coil spring fixedly supported by the perch, the shaft and the first tube slidably displaced relative to each other upon suspension loading to lengthwise compress the coil spring; and
   a guide disposed within and slidably supported along an inner diameter of the first tube and connected to the coil spring between the first and second ends of the coil spring, the guide displaced with the coil spring under suspension loading and limiting lateral displacement of the coil spring, wherein the guide includes an opening slidably receiving and guiding the shaft within the first tube.

2. The coil spring suspension of claim 1 wherein the guide is disposed proximate the second end of the first tube when the suspension is unloaded.

3. The coil spring suspension of claim 1 wherein the coil spring has smaller and larger diameter segments, the smaller diameter segment extending lengthwise between the guide and the second end of the coil spring.

4. The coil spring suspension of claim 3 wherein the guide has an outer diameter greater than the larger diameter segment of the coil spring.

5. The coil spring suspension of claim 4 wherein the larger diameter segment of the coil spring has an outer diameter that substantially equals an inner diameter of the first tube.

6. The coil spring suspension of claim 5 wherein the guide is non-elastomeric.

7. The coil spring suspension of claim 6 wherein the coil spring is helically connected to the guide.

8. The coil spring suspension of claim 7 further comprising a retaining ring fixedly and interiorly attached to the first tube proximate the second end of the first tube, the retaining ring having an inner diameter smaller than an outer diameter of the guide to prevent the guide from exiting the second end of the first tube.

9. The coil spring suspension of claim 8 wherein the shaft is slidably received in the opening of the guide therethrough, the first end of the shaft having a cap with a greater diameter than the opening of the guide.

10. The coil spring suspension of claim 9 further comprising a second tube having first and second ends, the first end of the second tube slidably receiving the second end of the first tube, the second end of the shaft fixed to the second end of the second tube.

11. The coil spring suspension of claim 10 wherein the first and second tubes form a first leg, the coil spring suspension further comprising a second leg including a third tube slidably receiving a fourth tube, the coil spring is a positive spring biasing the first and second tubes away from each other and the third and fourth tubes away from each other and the second leg includes a negative spring biasing the first and second tubes toward each other and the third and fourth tubes toward each other.

12. The coil spring suspension of claim 1 wherein the coil spring has smaller and larger diameter segments, the smaller diameter segment extending lengthwise between the guide and the second end of the coil spring.

13. The coil spring suspension of claim 12 wherein the guide has an outer diameter greater than the larger diameter segment of the coil spring.

14. The coil spring suspension of claim 13 wherein the larger diameter segment of the coil spring has an outer diameter that substantially equals an inner diameter of the first tube.

15. The coil spring suspension of claim 14 wherein the guide is non-elastomeric.

16. The coil spring suspension of claim 15 wherein the coil spring is helically connected to the guide.

17. The coil spring suspension of claim 1 further comprising a retaining ring fixedly and interiorly attached to the first tube proximate the second end of the first tube, the retaining ring having an inner diameter smaller than an outer diameter of the guide to prevent the guide from exiting the second end of the first tube.

18. The coil spring suspension of claim 17 wherein the shaft is slidably received in the opening of the guide therethrough, the shaft having first and second ends, the first end of the shaft having a cap with a greater diameter than the opening of the guide, the second end of the shaft fixedly supporting the second end of the coil spring.

19. The coil spring suspension of claim 18 further comprising a second tube having first and second ends, the first end of the second tube slidably receiving the second end of the first tube, the second end of the shaft fixed to the second end of the second tube.

20. The coil spring suspension of claim 19 wherein the first and second tubes form a first leg, the coil spring suspension further comprising a second leg including a third tube slidably receiving a fourth tube, the coil spring is a positive spring biasing the first and second tubes away from each other and the third and fourth tubes away from each other and the second leg includes a negative spring biasing the first and second tubes toward each other and the third and fourth tubes toward each other.

* * * * *